United States Patent [19]
Craig

[11] 3,719,967
[45] March 13, 1973

[54] MACHINE FOR EXTRACTING MEAT FROM CRAB SECTIONS

[76] Inventor: Warren J. Craig, 245 Hawthorne Road, Ellicott City, Md.

[22] Filed: Feb. 17, 1971

[21] Appl. No.: 115,972

[52] U.S. Cl. .............................. 17/71, 17/48, 17/54
[51] Int. Cl. .............................................. A22c 29/00
[58] Field of Search ......................... 17/71, 73, 48, 54

[56] References Cited

UNITED STATES PATENTS 3,151,351  10/1964  Reinke ..................................... 17/54
3,548,449  12/1970  Lockerby ................................. 17/48

*Primary Examiner*—Lucie H. Laudenslager
*Attorney*—Linton & Linton

[57] ABSTRACT

The present machine extracts the meat from the interior body sections of a crab by centrifugal force, that is after crab sections are placed on spinner discs each disc is moved along a line and rotated to discharge the meat into retainers on each disc whereupon the discs are stopped and then positioned for removal of the meat from each disc container by ejection means with each step being automatically carried out by the machine.

16 Claims, 15 Drawing Figures

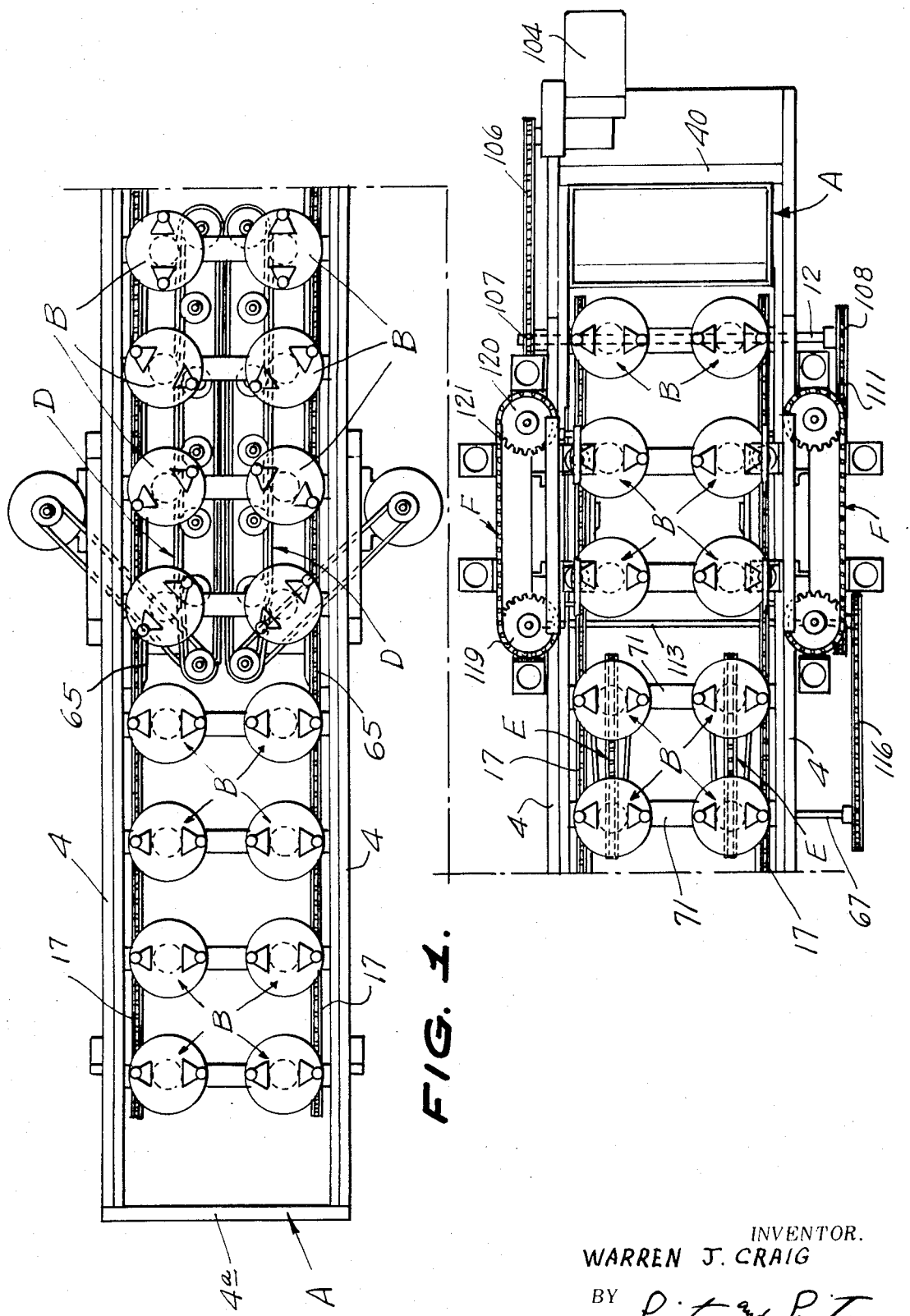

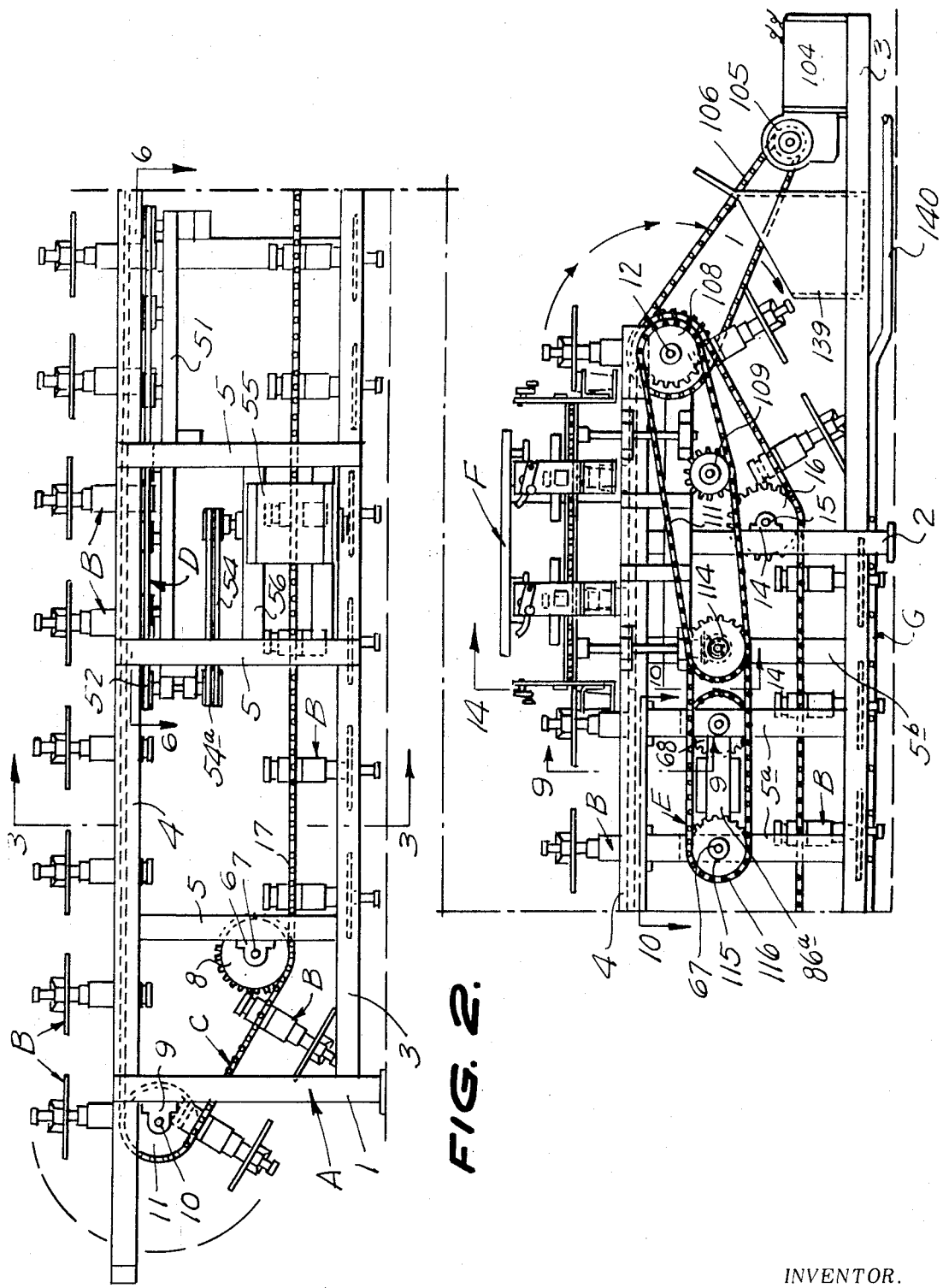

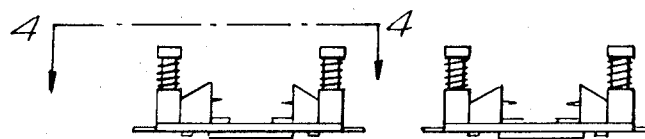
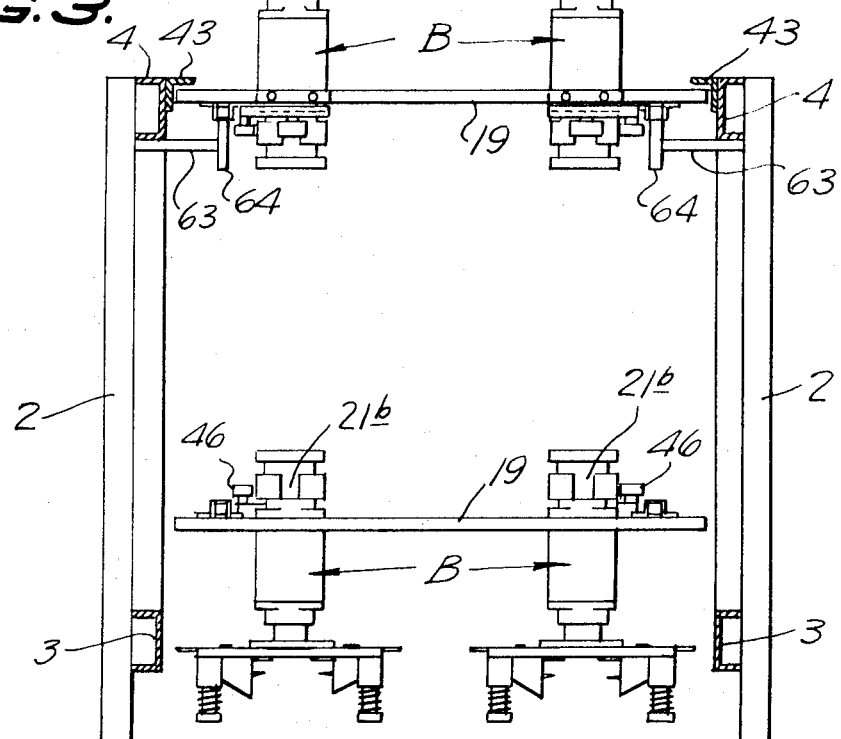
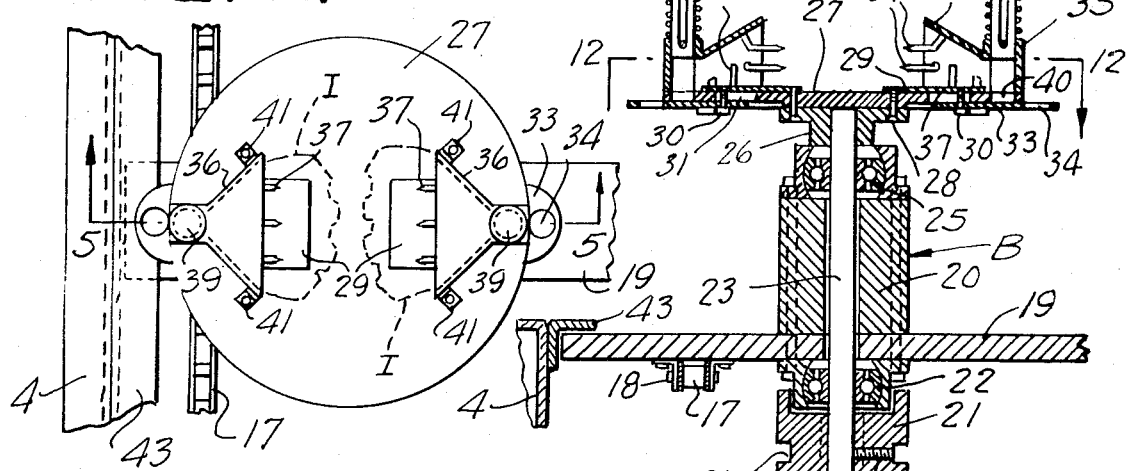

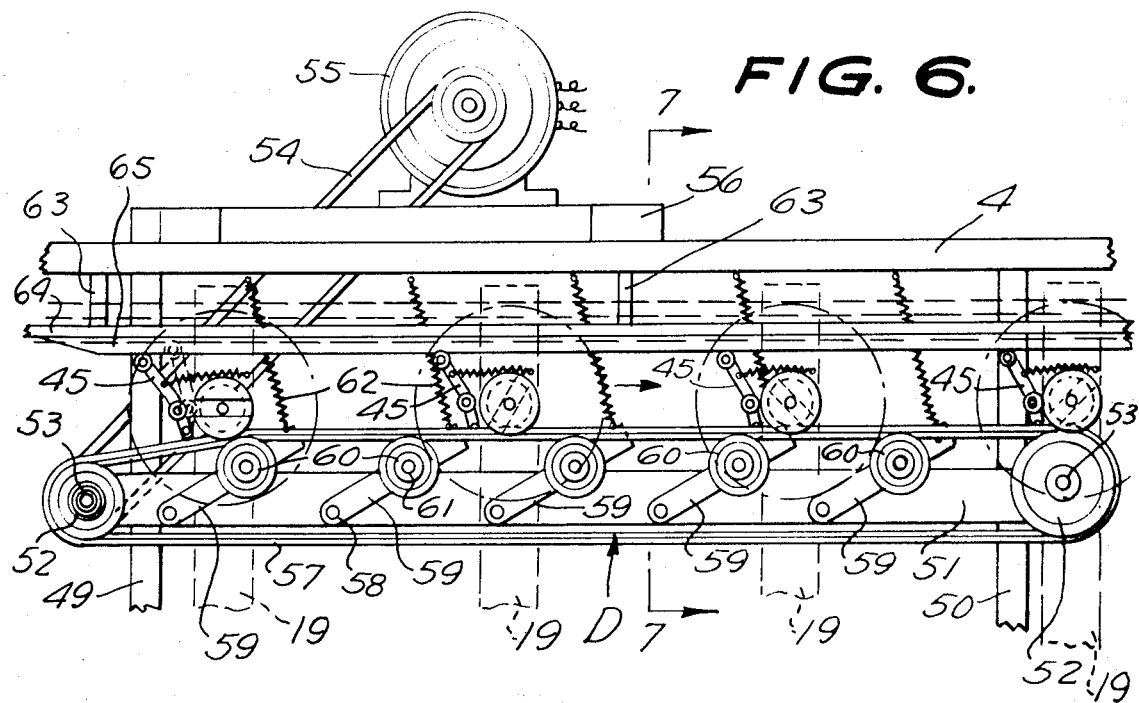
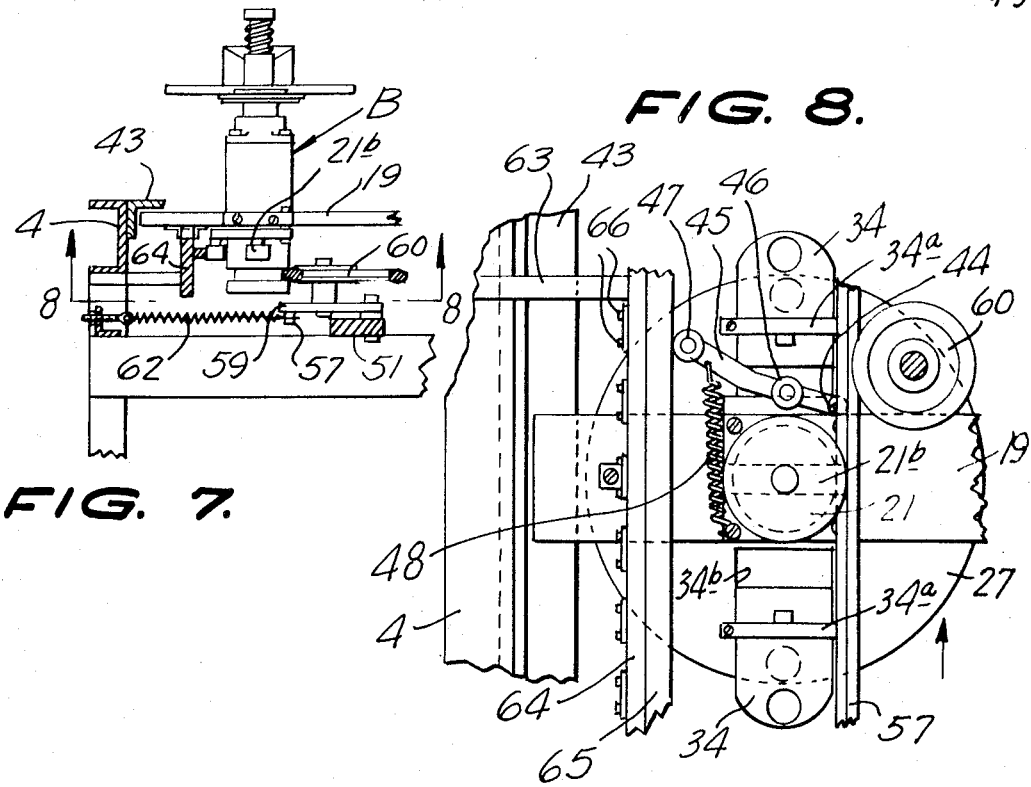

INVENTOR.
WARREN J. CRAIG
BY
ATTORNEYS

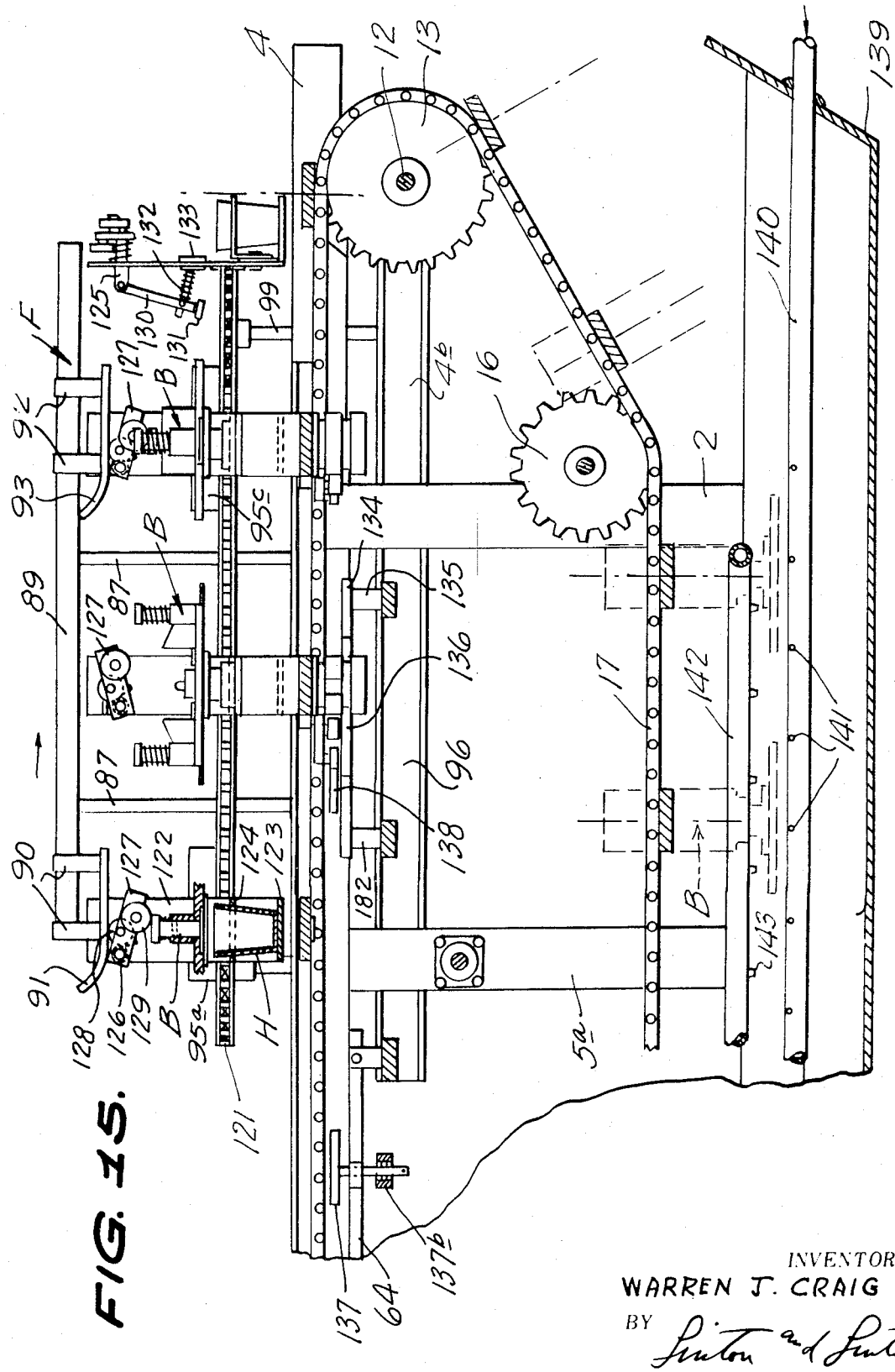

MACHINE FOR EXTRACTING MEAT FROM CRAB SECTIONS

The present machine is concerned with the automatic removal of meat from crab sections.

The principal object of the present invention is to extract crab meat from various sized crab sections at a high rate of speed with a minimal amount of shell or tissue content in a sanitary and safe manner and to provide an automatic machine for this purpose.

A further and important object of the invention is to provide means for extracting the meat from a plurality of crab sections at a time by centrifugal force and retaining the extracted meat in such a manner that it can be automatically fed in shipping and storing containers therefore.

A still further important object of the invention is to provide a driven line of spinner discs each capable of holding a plurality of crab sections and the meat extracted therefrom, including means for spinning each disc in its turn to extract the meat, stop such rotation and position each disc for the removal of the meat automatically by said means positioned along said line.

Further objects of the invention will be in part obvious and in part pointed out in the following detailed description of the accompanying drawings, in which, FIG. 1 is a top view of the present machine in two sections with the top section being the loading and meat removal portions and the bottom section being the braking and meat discharge portions of the machine FIG. 2 is a side elevation of FIG. 1

FIG. 3 is a cross-sectional view taken on line 3—3 of FIG. 2

FIG. 4 is an enlarged top view taken on line 4—4 of FIG. 3

FIG. 5 is a cross-sectional view taken on line 5—5 of FIG. 4

FIG. 6 is an enlarged top view of the spinning portion for one line of the machine FIG. 7 is a cross-sectional view taken on line 7—7 of FIG. 6

FIG. 8 is an enlarged sectional view taken on line 8—8 of FIG. 7

FIG. 15 is a longitudinal sectional view taken on line 15—15 of FIG. 14.

Figure 9:
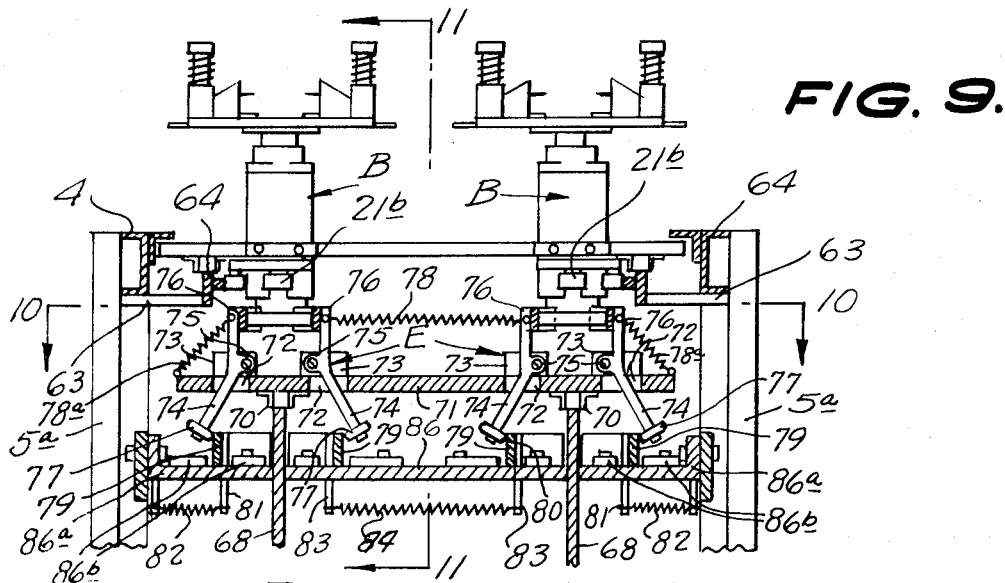
FIG. 9 is a cross-sectional view taken on line 9—9 of FIG. 2

Referring now more particularly to the accompanying drawings wherein like and corresponding elements are disignated by the same reference character, there is shown a machine having a frame A on which are mounted two similar lines each having a plurality of spinner means B, endless driven chain C carrying said spinner means, a portion D for rotating each spinner means in its turn, a portion E for braking each spinner means moving therethrough, portion F for discharging meat from each side of each spinner means passing thereby and cleansing portion G. Said two lines are side by side longitudinally of the machine and as each line is substantially the same only one line is hereinafter described in detail. However the machine may have only one such line or as many as desired instead of the two lines shown.

Frame A has two pairs of legs 1 and 2, longitudinal beams 3 at the bottom and 4 at the top connected to said legs with uprights 5 and 5a connecting beams 3 and 4 on each side of the machine and cross bars 4a connecting the ends of said beam 4.

Bearings 6 on the left hand pair of uprights 5 in FIG. 2 rotatably supports a shaft 7 on which a pair of sprocket 8 are rotatably mounted. Bearings 9 on leg 1 rotatably supports shaft 10 on which a pair of sprockets 11 are rotatably mounted. Beams 4b suspended from beams 4, rotatably support shaft 12 on which is rotatably mounted sprocket 13, while bearings 14 on legs 2 rotatably support shaft 15 on which is rotatably mounted sprockets 16. A pair of endless chains 17 each extends around the ones of said sprockets 8, 11, 13 and 16 on the same side of frame A and each chain 17 provides the drive for one of said lines.

Each pair of said spinning means B is mounted on a crossbar 19 attached by brackets 18 to said pair of chains 17. The individual spinning means B each have a cylindrical base 20 attached to a cross-bar 19, a drive pulley 21 having a peripheral groove 21a, a bearing 22, a shaft 23 fixed to pulley 21 by a set screw 24 and extending through bearing 22, bar 19, base 20 and a bearing 25 on top of said base. A pedestal 26 is attached to shaft 23 by a set screw (not shown) and fixed to spinner disc 27 by rivets, screws or the like 28.

Each disc 27 has a pair of diametrically opposite plates 29 slideable thereon with each plate 29 attached by a rivet 30 extending through a slot 31 in disc 27 to a cam plate 33 slideably mounted on the bottom of disc 27. Also each plate 29 has a pair of upright prongs 32. Each cam plate 33 has an opening 34 capable of being in line, at times, with the bore of a tubular end 35 of a wedge shaped catcher 36. Each character 36 has pointed prongs 37 extending over the plate 29 slideable into said catcher.

A plunger 39 is slideably mounted in each of said tubular ends 35 with a spring 38 therearound tending to hold the plunger extended outwardly of said tubular end. Disc 27 has a pair of openings 40 each below the bore of one of said tubular ends.

Brackets 41 attached to catchers 36, are attached to disc 27 by rivets, screws or the like 42.

Each beam 4 has an angle iron 43 attached thereto and extending longitudinally thereof for preventing bars 19 from rising above said beams.

Each of said spinning means B also has a pin 44 attached to its bar 19 and pivotally supporting one end of a lever 45 carrying an intermediate roller 46 and an end roller 47. Roller 46 is positioned to at times ride in groove 21a of its drive pulley. Said drive pulley also has a diametrically extending slot 21b opening at its ends in said groove 21a. Spring 48 is connected to lever 45 and bar 19 and tends to hold roller 46 against the periphery of said drive pulley. Thus roller 46 can enter either end of slot 21b when said slot is in front of said roller and the roller then prevents the rotation of said drive pulley and disc 27 until lever 45 is pivoted outwardly from said drive pulley.

The drive portion D of the machine has two similar sections, one for each line, and thus only one section is herein described in detail.

Cross-bars 49 and 50 extend between and are attached to uprights 5 and support a pair of plates 51 attached thereto and extending longitudinally of the machine, with each plate being for one of said lines. A pair pulleys 52 are fixedly mounted on shafts 53 rotatably mounted through each end of each plate 51, while endless belts 54 extends around the drive pulley of a motor 55 and around a pulley 54a fixedly attached to one of said shafts 53. Motor 55 is mounted on base 56 attached to two of said uprights 5.

An endless belt 57 extends around pulleys 52. Stud axles 58 extend upright on plate 51 and each pivotally support an end of one of said levers 59 which rotatably support rollers 60 on stud axles 61 mounted upright on said levers. The outer end of each lever 59 is connected to one of the springs 62 attached to one of the beams 4, pulling rollers 60 against one run of belt 57.

Arms 63 extend normal to and are attached to one of said beams 4 and have a bar 64 attached thereto. A cam bar 65 is attached to bar 64 by bolts 66 and positioned longitudinally of the machine at a point for engaging each roller 47 as it passes thereby to pivot the attached roller 46 from its drive pulley 21 and thus free said drive pulley for rotation. Belt 57 is positioned to engage groove 21a of each said drive pulley passing therealong to rotate the free drive pulley.

The brake portion E of the machine also has two similar sections, one for each line of the machine, and therefore both sections have been given the same numerals for like elements as described in detail hereinafter.

A shaft 67 is rotatably supported through bearings mounted through two opposite uprights 5a. A pair of sprockets 68 are fixedly mounted on shaft 67, while a second shaft 69 is rotatably supported by further bearings 5a mounted through the second pair of opposite uprights 5a. A second pair of sprockets 68 are rotatably mounted on shaft 69 and a pair of endless chain 70 each extends around a pair of sprockets 68 in line with one another. A series of plates 71 are attached to both chains 70 and extend laterally thereof in spaced apart relationship one behind the other.

Each plate 71, see FIG. 9, has openings 72 with brackets 73 mounted thereabove, and two pairs of bent levers 74 each extending through one of said openings and pivotally supported by pins 75 on said brackets. Each bent lever 74 carries a brake shoe 76 at one end and a roller 77 at the opposite end. Springs 78 are connected to the inner pair of levers 74 while springs 79 are connected to the outer levers 74 and their plate 71 tending to pull each pair of brake shoes from one another.

An outer pair of cam bars 79 each have a link 81 with springs 82 connecting said links 81 with cross-bar 86 fixedly attached to uprights 5a by plates 86a. An inner pair of cam bars 80 have links 83 connected by spring 84. Cam bars 79 and 80 are pivotally connected at their front end to arms 85a extending from cross-bar 85 and slideably rest on cross-bar 86 between stops 86b on each side thereof.

The meat discharge portion F of the machine has two similar sections, one on each side of frame A for each line, and therefore only one such section is described in detail hereinafter.

Each discharge section has uprights 87 mounted on a beam 4 with lateral arms 88 supporting bar 89. Links 90 attached to bar 89 support a cam 91 while links 92 suspended from bar 89 support a second cam 93.

Figure 14:
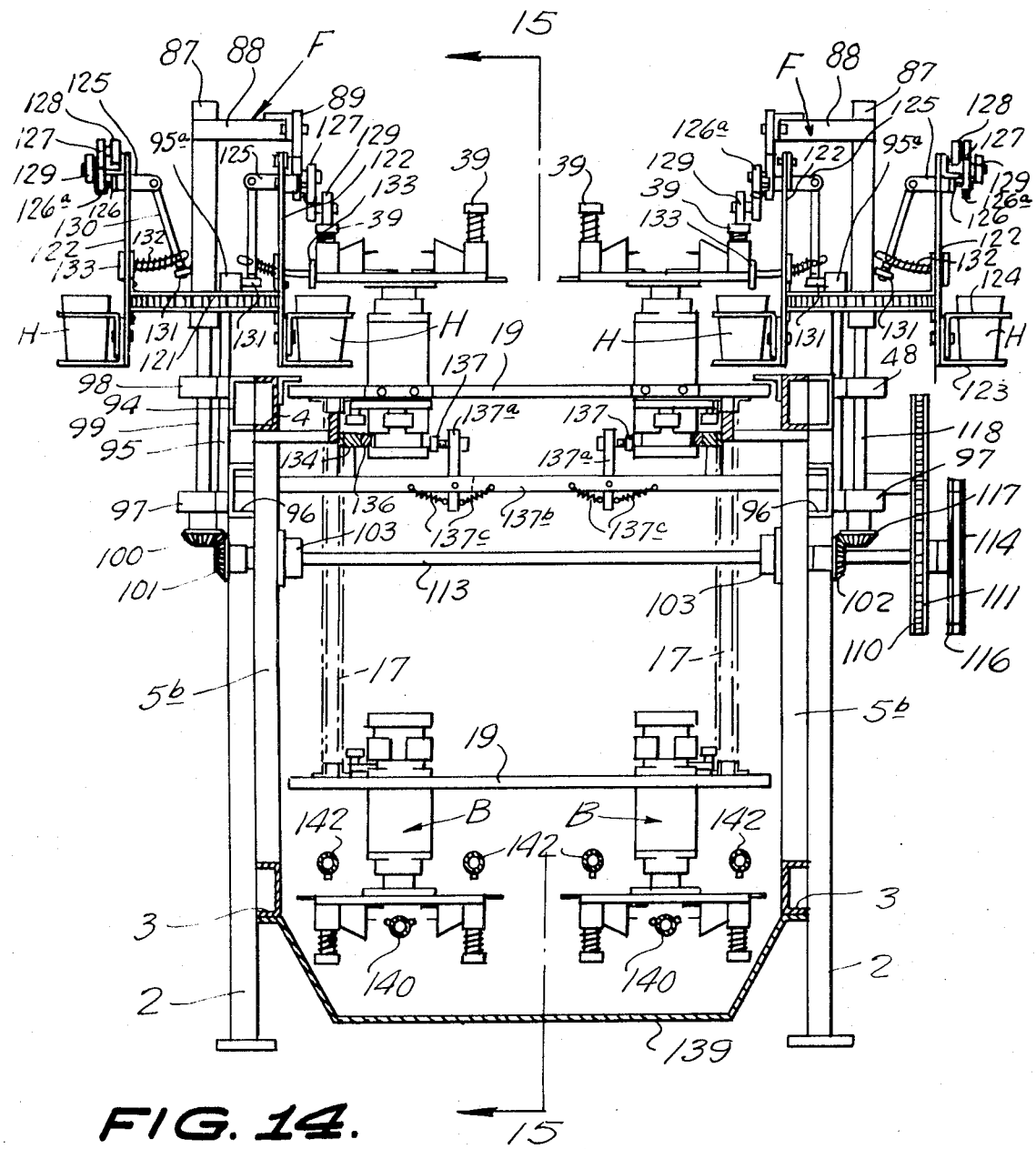
FIG. 14 is an enlarged cross-sectional view taken on line 14—14 of FIG. 2.

A beam 94 is attached to beam 4 and rods 95 attached to beams 94 and 96 support, see FIG. 14, cams 95a.

A pair of shafts 99 are rotatably supported in bearings 97 and 98 attached to beams 96 and 94, respectively. A bevel gear 100 is fixedly attached to one of said shafts 99 and meshes with a bevel gear 101 fixedly attached to shaft 113 rotatably supported through bearings 103 in uprights 5b attached to beams 3 and 4. A bevel gear 102 is also fixedly attached to shaft 113.

An electric motor 104 is mounted on beams 3 and has a drive sprocket 105 around which extends endless chain 106 which also extends around sprocket 107 fixedly attached to shaft 12 for driving the same. A second sprocket 108 is also fixedly attached to shaft 12. Idler sprocket 109 is rotatably supported from beams 96 while sprocket 110 is fixedly attached to shaft 113 and endless chain 111 extends over sprockets 108, 109 and 110.

A sprocket 114 is also fixedly attached to shaft 113 and sprocket 115 is fixedly attached to shaft 67 with endless chain 116 extending around sprockets 114 and 115.

A bevel gear 117 meshes with bevel gear 102 and is fixedly connected to shaft 118 of the second section, which corresponds to shaft 99 of the first section.

Sprockets 119 and 120 are fixedly mounted on shafts 99 while endless chain 121 extends around said sprockets. A series of supports 122 are attached to chain 121 at spaced apart intervals along the length thereof and each support has a lateral base 123 for supporting a cup H and flange 124 with an opening through which the cup extends. There is a lateral arm 125 on each support 122 with a pin 126 extending from one end of each arm pivotally supporting a lever 127 rotatably carrying a roller 128 on one side and a second roller 129 on its opposite side. Coil springs 126a are each around each pin 126 and connected to one arm 125 and its lever 127 tending to retain said lever in a raised position.

Each arm 125 also pivotally supports a lever 130 which has a roller 131 on one end and a pusher 133 extending through its support 122. A spring 132 surrounds each pusher between its lever 130 and support 122 tending to hold the pusher against the support 122.

A bar 134 mounted on arms 135 supported from beam 96, has friction material 136 attached thereto to be engaged by each drive pulley 21 passing thereby to give the drive pulley a small amount of rotation.

Friction material 137 is carried by arms 137a pivotally mounted on cross-bar 137b connected to beams 96, while springs 137c are attached to the lower ends of said arms 137a and to cross-bar 137b positioning said friction material 137 so as to engage said drive pulleys 21 after they leave the brake section E and before the discharge section F, to give the drive pulley a slight rotation at that time.

A cam 138 is attached to the inner face of beam 4 and positioned for being engaged by each roller 47 passing thereby to release the drive pulley for rotation.

A waste receptacle 139 is positioned beneath the meat discharge portion F of the machine and spray pipes 140 with outlets 141 beneath chain 17 and pipes 142 with outlets 143 are positioned above and at each side of chain 17 whereupon cleaning media under pressure will be sprayed against the spinner members B.

Crabs from which the meat is to be extracted by the present machine, first have the top shell, claws, fins, bottom shell and undesirable material removed manually or by conventional means from the meat containing section of the crab body. Said meat containing section is then separated into its two similar halves I.

In the use of the machine two pairs of operators position themselves with an operator at each corner of the machine and the operator at the left end of the machine as shown in the top of FIG. 1 will, after motors 55 and 104 are placed in operation, each place a crab half I on one of the plates 29 on a disc 27, see FIG. 4, in front of the operator. That is, each crab half I has prongs 32 of its plate 29 inserted into the crab half with the open side of the crab half facing its corresponding catcher 36. Rollers 46 retain the disc 47 upon which the crab halves are being placed, from rotation at this loading portion of the machine, while chains 17 continue to move the spinner means B longitudinally of the machine.

As the two lines of the machine are similar only one line is described. Thus as each loaded spinner means B in one line enters the rotating portion D, each roller 47 engages cam 65 pivoting lever 45 and moving its roller 46 from slot 21b freeing its drive pulley 21 for rotation. Said drive pulley 21 contacts belt 57 causing said drive pulley and its disc 27 to rotate. A suitable speed for the rotation of disc 27 is 2,000 r.p.m. As long as the spinner means B remains in contact with belt 57, the plates 29 are each moved by centrifugal force into their catcher 36 so that prongs 37 enter the crab half and the meat from the crab half is ejected therefrom by the centrifugal force and enters the space below its plunger 39.

The movement of the plate 29 moves its respective cam plate 33 outwardly closing the opening 40 thereabove.

Figure 10:
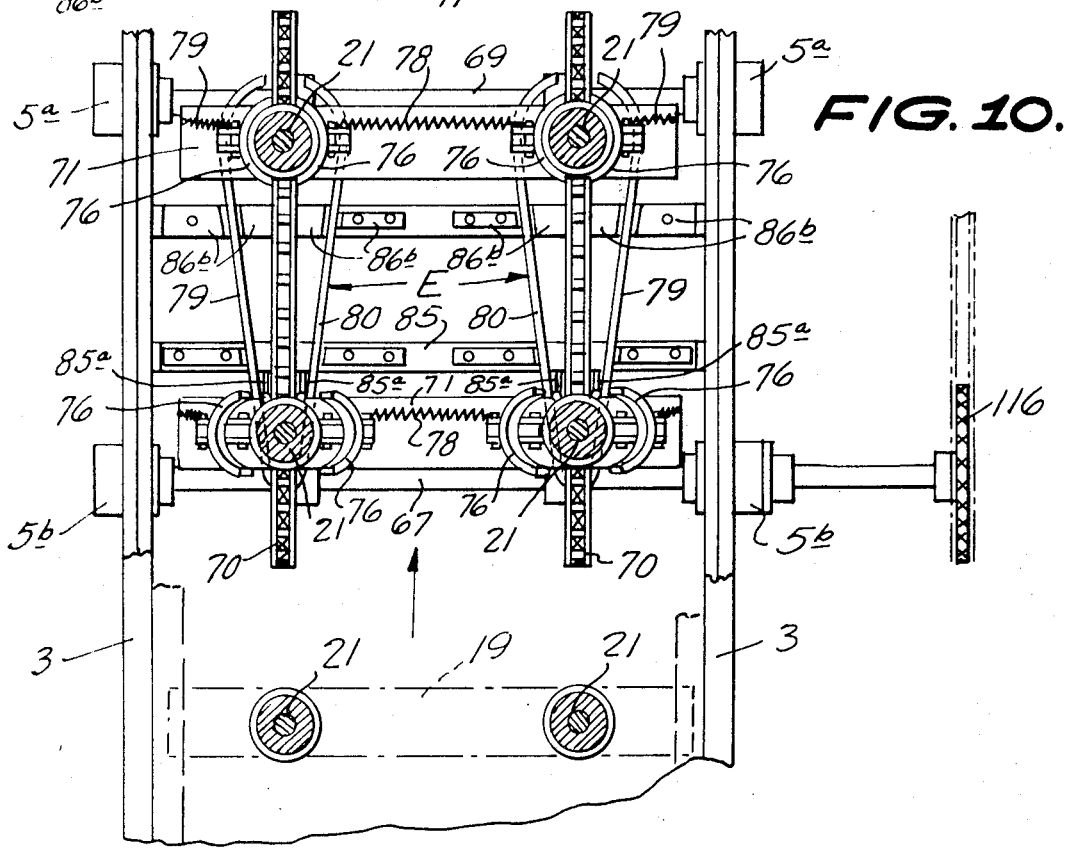
FIG. 10 is a sectional view of the braking portion of the machine taken on line 10—10 of FIG. 9
Figure 11:
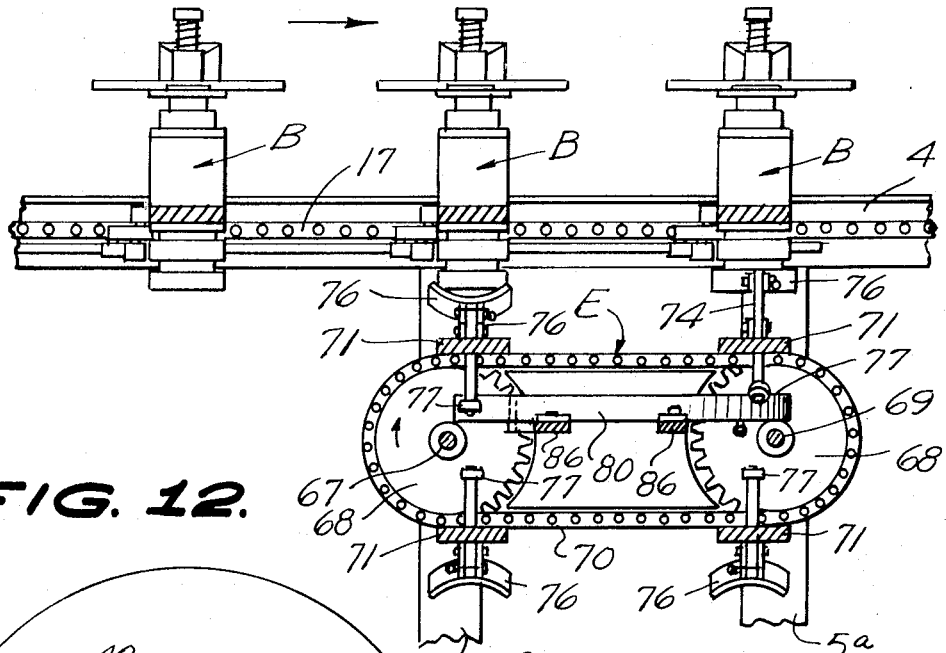
FIG. 11 is a longitudinal sectional view taken on line 11—11 of FIG. 9
Figure 12:
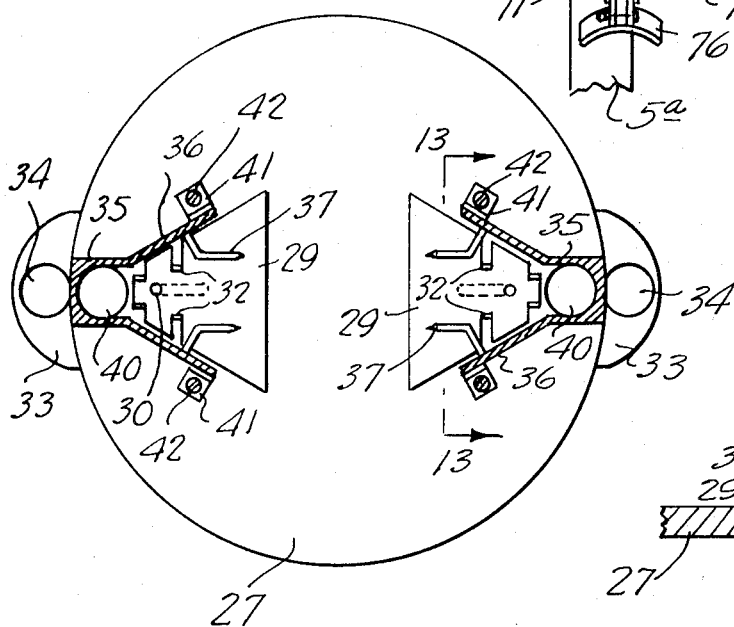
FIG. 12 is a sectional view taken on line 12—12 of FIG. 5
Figure 13:
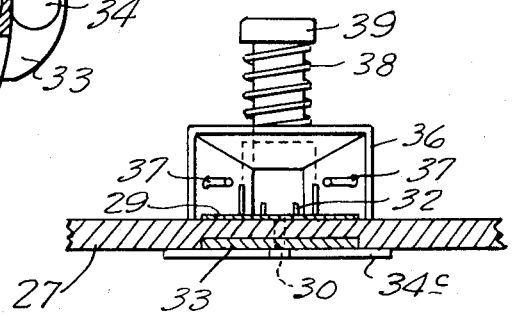
FIG. 13 is a sectional view taken on line 13—13 of FIG. 12

After each spinner means B leaves belt 57 it enters the braking portion E whose brake shoes 76 are travelling longitudinally of the machine at the same speed as said spinner means. Thus each spinner means has its drive pulley 21 move between a pair of open brake shoes 76 as shown in the lower portion of FIG. 10. This pair of brake shoes has their rollers 77 running along cams 79 and 80 causing levers 74 to move outwardly from one another bringing their brake shoes 76 together around the drive pulley 21 therebetween gradually braking said drive pulley to stop its rotation at the top portion of FIG. 10. As the rollers 77 leave cams 79 and 80 of the top portion of FIG. 10, springs 78 and 78a cause the brake shoes to separate and release the drive pulley therebetween.

Shortly thereafter each drive pulley 21 engages friction material 137 to give said drive pulley a slow and short rotation, while the roller 47 connected to this drive pulley leaves cam 64 and its roller 46 enters slot 21b stopping the rotation of its disc 21 and positioning its plunger 39 on a line extending perpendicular to chain 17.

The thus stopped spinner means B enters the discharging portion F of the machine.

Chains 121 are running at the same speed as chains 17 and supports 122 are spaced apart the same distance as cross-bars 19 and positioned on chains 122 so that each spinner means B is positioned alongside one of said supports during the travel of said spinners means through said discharge portion F with the one of its plungers 39 beneath roller 129 of the accompanying support 122.

Also as each spinner means arrives at chain 121 at the left of FIG. 15, a roller 131 engages a cam 95a and pushes a pusher 133 against the protruding end of the spinner means cam plate 33 opposite thereto moving cam plate opening 34 beneath opening 40 thereabove and the attached plate 27 away from receiver 36 and crab half I from its prongs 37.

Thereupon the roller 128 thereabove engages cam 91 pivoting its lever 127 and moving roller 129 onto the top of the plunger 39 therebeneath causing said plunger to push the extracted crab meat through openings 40 and 34 into the cup H therebeneath.

As each spinner means then passes cam 138, its roller 47 engages said cam moving its connected roller 46 from its slot 21b freeing the driving pulley therewith for rotation whereupon said driving pulley engages friction material 136 giving said driving pulley a slight rotation. Roller 47 then leaves cam 138 and its roller 46 reenters slot 21b stopping the second plunger 39 of said spinner means beneath said roller 129.

Thereafter the second cam plate 33 still projecting and beneath said second plunger is pushed inwardly by roller 131 striking a second cam 95c and pushing pusher 133 against said second cam plate. Thus the second plate 29 connected to the second cam plate 33 is moved from its catcher 36, the crab half thereon is moved from prongs 37 and opening 34 of said second cam plate is in alignment with the opening 40 thereabove.

Thereupon the roller 126 of lever 127 above said second plunger engages cam 93 and its roller 129 pushes said second plunger downwardly discharging the crab meat in cup H. The operators at the right end of the machine, in FIG. 15, remove the cups which can be capped manually or by suitable machines.

Each spinner means B then goes around one of the sprockets 13 dumping the empty crab halves into a receptacle 139 and media such as hot water, steam or the like are sprayed by outlets 141 and 143 against both sides of each disc 27 to cleanse and sterilize the same. The spinner means continue around sprocket 11 and the above described cycle of operation thereof repeated.

I claim:

1. A machine for extracting meat from crab sections comprising at least one spinner means including one rotatably mounted disc, at least one crab section supporting plate slideable radially of said disc, a meat catcher positioned on said disc in front of said plate and having a tubular portion opening through said plate, a spring loaded plunger slideably mounted in said tubular portion, and a cam plate connected to said crab section supporting plate and having an opening capable of being in alignment with said tubular portion, means for rotating said disc sufficiently to extract meat from said crab section thereon, means for stopping said disc and discharging means for moving said plunger to force extracted meat from said tubular portion.

2. A machine for extracting meat from crab sections as claimed in claim 1 wherein said crab section supporting plate has projections upon which the crab section can be impaled and said catcher has prongs positioned for impaling said crab section upon rotation of said disc.

3. A machine for extracting meat from crab sections as claimed in claim 1 including a plurality of said spinner means, a driven endless chain connected to said spinner means for moving the same along a line, said rotating means, stopping means and discharging means being positioned along said chain with their operation coordinated with said chains.

4. A machine for extracting meat from crab sections as claimed in claim 3 wherein each spinner means has a tubular base connected to said chain, a drive pulley connected to its disc and a side opening, a lever pivotally connected to said chain, and a roller on said lever capable of entering said drive pulley side opening to retain said drive pulley from rotation and a cam is positioned along said rotating means and stopping means for pivoting said lever and moving said roller from said drive pulley side opening to free said disc.

5. A machine for extracting meat from crab sections as claimed in claim 4 wherein said rotating means includes a driven endless belt and means supporting said belt alongside a portion of said chain in a position for engaging and rotating each drive pulley moving therealong.

6. A machine for extracting meat from crab sections as claimed in claim 4 wherein said stopping means includes at least one brake shoe, means for moving said brake shoe along said chain in coordination with the movement of said spinner means and means for moving said brake shoe against the one of said drive pulleys moving therewith at a time.

7. A machine for extracting meat from crab sections as claimed in claim 6 wherein said brake shoe moving means is an endless chain connected thereto and means for driving said endless chain in coordination with said first mentioned chain.

8. A machine for extracting meat from crab sections as claimed in claim 7 wherein said brake shoe against said drive pulleys includes a lever pivotally connected to said second chain and carrying said brake shoe at one end and a fixed cam positioned for engaging and moving the other end of said lever.

9. A machine for extracting meat from crab sections as claimed in claim 4 wherein said discharging means includes at least one cup support, means for moving said cup support along with one of said spinner means, a lever pivotally mounted on said support, a roller on said lever, a fixed cam positioned to be engaged by said roller for pivoting said lever against and depressing the plunger of said spinner means and means for moving the spinner means cam plate to its meat discharging position.

10. A machine for extracting meat from crab sections as claimed in claim 9 wherein said cup support moving means is an endless chain and means for moving and supporting said chain alongside a portion of said first mentioned chain.

11. A machine for extracting meat from crab sections as claimed in claim 9 wherein said cam plate moving means includes a lever pivotally connected to said support, a pusher connected to said lever and extending through said support to engage the cam plate, resilient means tending to hold said pusher from its cam plate engaging position and a fixed cam positioned for engaging said lever and moving said pusher to its cam plate engaging position.

12. A machine for extracting meat from crab sections as claimed in claim 4 including friction material positioned for engaging each drive pulley after the stopping means for rotating said drive pulley to position the plunger connected to said drive pulley for operative engagement with said discharging means.

13. A machine for extracting meat from crab sections as claimed in claim 12 wherein said discharging means includes a plurality of cup supports, means for moving said cup supports along a portion of said first mentioned chain, a plurality of levers each pivotally mounted on one of said supports, a plurality of rollers each carried by one of said levers, a pair of fixed cams positioned for engaging said rollers in succession for pivoting said levers against and depressing the plunger of each spinner means passing beneath said cams, pushers each carried by one of said supports for moving the spinner means cam plate moving therewith, to its meat discharging position and further fixed cams positioned for being operatively engaged by said pushers.

14. A machine for extracting meat from crab sections as claimed in claim 13 including a cam positioned for engaging each spinner means lever moving between said pair of fixed cams freeing the drive pulley thereof and friction material positioned to engage the freed drive pulley and move the connected second plunger beneath the cup support lever thereabove whereby said second plunger will be depressed by engagement of the roller of said lever with the second of said pair of fixed cams and the second of the cam plates will be moved inwardly by engagement of the pusher carried by the respective cup support engaging one of said further fixed cams.

15. A machine for extracting meat from crab sections as claimed in claim 1 including means for sterilizing each of said spinner means after leaving said discharging means.

16. A machine for extracting meat from crab sections as claimed in claim 1 wherein said meat catcher has a hollow interior wedge shape with a wide open mouth and closed smaller end including said tubular portion and said plate extends into said meat catcher mouth.

* * * * *